A. A. CLARK.
TRUCK.
APPLICATION FILED JUNE 10, 1921.

1,428,004.

Patented Sept. 5, 1922.
2 SHEETS—SHEET 1.

Inventor
Albert A. Clark
By Frease, Merkel, Saywell and Bond
Attorneys

A. A. CLARK.
TRUCK.
APPLICATION FILED JUNE 10, 1921.

1,428,004.

Patented Sept. 5, 1922.
2 SHEETS—SHEET 2.

Inventor
Albert A. Clark.

By Frease, Merkel, Saywell and Bond
Attorneys

Patented Sept. 5, 1922.

1,428,004

UNITED STATES PATENT OFFICE.

ALBERT A. CLARK, OF ORRVILLE, OHIO, ASSIGNOR TO THE WILL-BURT COMPANY, OF ORRVILLE, OHIO, A CORPORATION OF OHIO.

TRUCK.

Application filed June 10, 1921. Serial No. 476,620.

*To all whom it may concern:*

Be it known that I, ALBERT A. CLARK, a citizen of the United States, residing at Orrville, in the county of Wayne and State of Ohio, have invented a new and useful Truck, of which the following is a specification.

This invention relates to trucks and more particularly to an unloading truck for unloading automobiles from freight cars, being especially adapted for unloading the Ford automobile, which is shipped in knock-down condition, and placed in a certain position within the freight car.

Those who have had experience in unloading automobiles shipped in this manner will appreciate the difficulty attendant on unloading the automobiles. The present device is designed for the purpose of easily and quickly unloading automobiles which are shipped in this manner from the freight cars, and has for its objects the provision of a truck which may be easily placed within the car, and inserted beneath the front axle of the automobile, an adjustable shaft or post being provided for engagement with the transmission shaft tube near the rear end of the automobile, after which the truck may be wheeled from the car and the automobile lowered into horizontal position and supported upon the truck until the wheels have been placed thereon, the automobile then being moved from the truck.

With these objects in view the invention consists in the construction and arrangement of parts, hereinafter described and illustrated in the accompanying drawings, it being understood that various changes in the form and details of construction may be made within the scope of the appended claims.

The invention thus set forth in general terms is illustrated in the accompanying drawings, in which—

Figure 1:
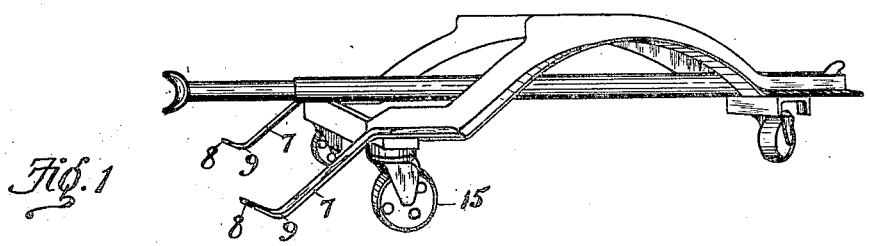
Figure 4:
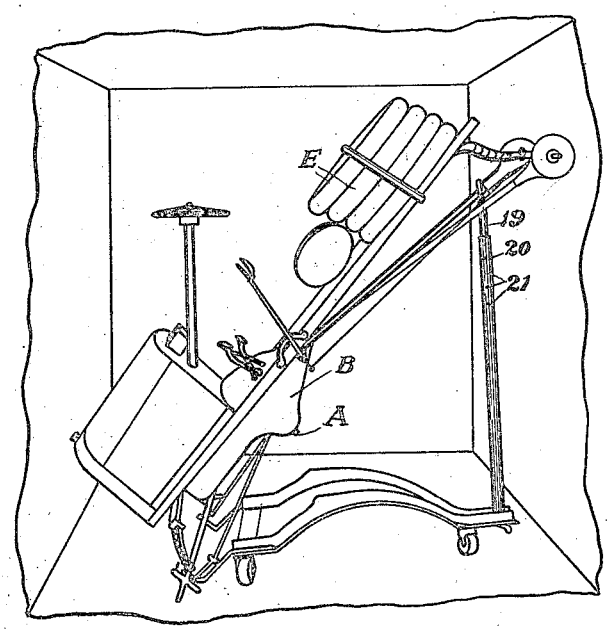
Figure 5:
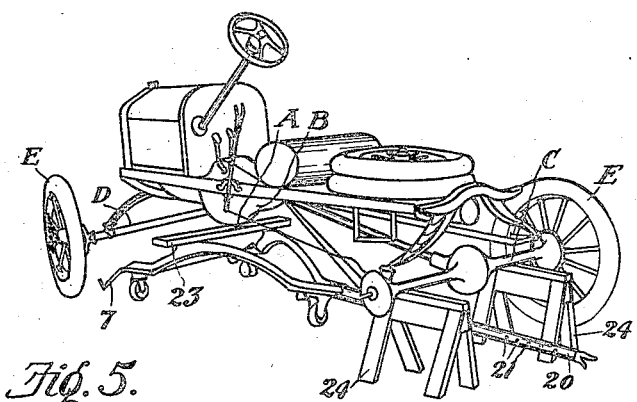
Figure 3:
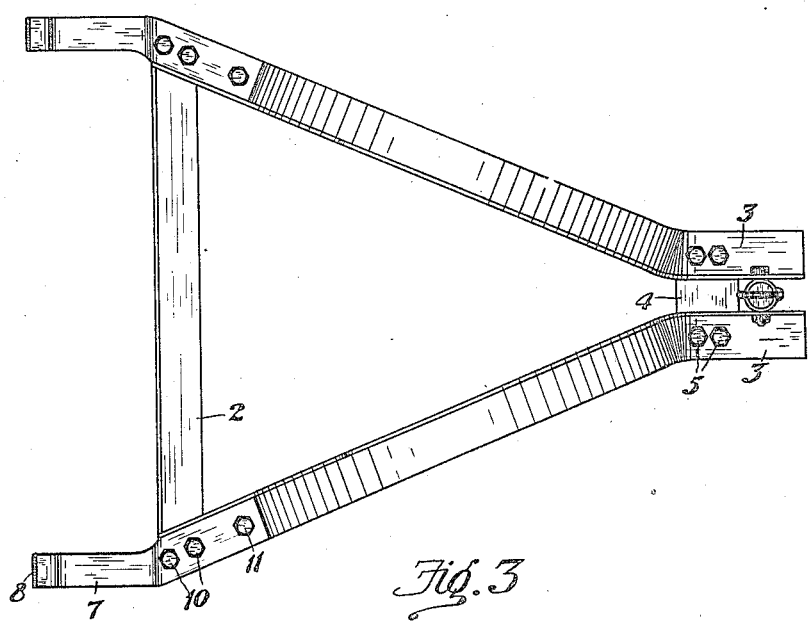
Figure 2:
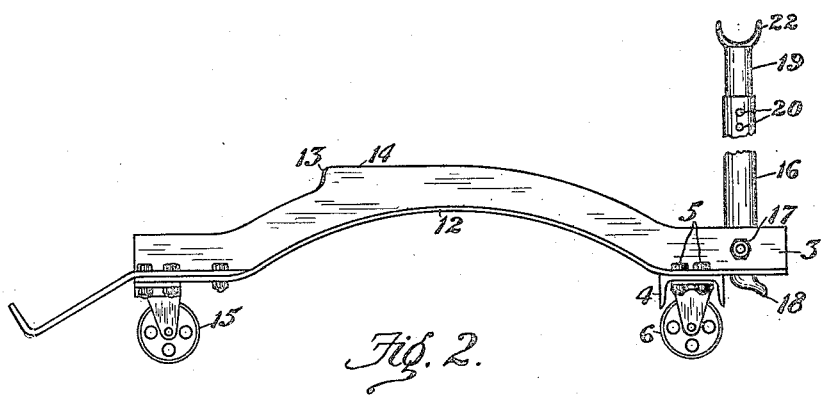

Figure 1 is a perspective view of a truck embodying the invention, the post or shaft being shown in the folded position;

Fig. 2, a side elevation of the truck with the post or shaft in the vertical or raised position;

Fig. 3, a plan view of the truck;

Fig. 4, a perspective view of a portion of the interior of a freight car, showing an automobile therein in the position in which the automobile is shipped, the truck being shown in position beneath the automobile; and Fig. 5, a perspective view showing the truck after the automobile has been removed from the car, the automobile being lowered into the horizontal position upon the truck for the purpose of placing the wheels thereon.

Similar numerals of reference indicate corresponding parts throughout the drawings.

The truck includes a V-shaped or triangular frame comprising the angle iron side members 1 connected at their forward extremities to the cross member 2, the rear extremities thereof converging and terminating in the parallel portions 3 which are connected to the depending channel member 4 as by the bolts 5, a swivel castor 6 being mounted within said channel member.

At the forward end of the truck are provided the depending axle supports 7, each of which is provided with the upturned extremity 8 forming a depression 9 for receiving the front axle of the automobile, these axle supports being connected to the side members 1 of the frame as by the bolts 10 which screw the side members to the cross member 2 and by a bolt 11.

Each of the side members 1 is arched as shown at 12 and the upper surface of each of these side members is preferably provided with a lug 13 forming a flat portion 14, the purpose of which will be hereinafter described.

A pair of swivel castors 15 are connected to the cross bar 2, thus providing a three point support for the truck upon three swivel castors, providing for easily moving the truck in any direction when loaded.

The post or shaft comprises the tubular portion 16 connected at its lower end portion to the parallel projections 3 of the side members by a bolt 17 or the like, upon which the post is pivoted, the curved lower extremity 18 of the post being arranged to engage the channel iron 4 when the post is used as a shaft or tongue to propel the truck manually.

The tube or rod 19 is inserted in the upper or free end of the tube 16 and a pin 20 is adapted to be passed through any desired aperture 21 in the tube 16 and a suitable corresponding aperture in the tube or rod 19 to hold the tube 19 in any desired adjustment. A fork 22 is provided upon the upper or free end of the tube 19 and arranged to engage the transmission shaft tube of the automobile.

The operation of the truck is as follows; the truck is wheeled into the freight car in which the automobile is located in the position shown in Fig. 4 and the truck is placed beneath the automobile, the post being in the collapsed position. The pointed end of the truck is then raised up, the two arms 7 being slipped beneath the front axle of the automobile, after which the pointed end of the truck is placed down into the normal position, raising the front axle of the automobile several inches above floor of the car.

The automobile is then tilted, raising the rear axle clear of the side wall of the car and the post is extended, the fork thereof engaging the transmission shaft tube of the automobile just in front of the differential housing and the pin 20 is inserted to hold the post in this position.

The automobile is thus supported entirely upon the truck in practically the same position in which it was located within the car, being tilted, however, at a slightly greater angle in order to clear the sides of the car. The truck may then be easily wheeled out of the car with the automobile thereon in this position.

The board or the like such as shown at 23 is placed upon the flattened portions 14 of the curved side members of the truck, beneath the drain plug A in the crank case B upon which point the automobile will substantially balance. The rear end of the automobile is then raised out of engagement with the post, the post being dropped back as shown in Fig. 5 and the rear portion of the automobile lowered upon the tressles 24 which are placed in suitable position adjacent to the truck to receive the rear axle C of the automobile, the front axle D thereof being thus raised out of engagement with the supports 7.

The front and rear axles of the automobile are thus supported at the same height above the ground and at a suitable distance therefrom to allow sufficient clearance for placing the wheels E of the automobile upon the axles. After the wheels are in place, the plank 23 and tressles 24 are removed and the truck withdrawn from beneath the automobile. The entire operation of unloading the automobile and assembling the wheels thereon may be easily accomplished by two men.

Although the drawings and above specification disclose the best mode in which I have contemplated embodying my invention, I desire to be not limited to the details of such disclosure, for, in the further practical application of my invention, many changes in form and construction may be made, as circumstances require or experience suggests, without departing from the spirit of the invention, within the scope of the appended claims.

I claim:—

1. A truck comprising a wheeled, V-shaped frame having vertically arched side members, depending support arms at one end of the frame and a forked, adjustable post pivotally connected to the other end of the frame.

2. A truck comprising a wheeled frame, having vertically arched side members, depending support arms at one end of the frame and a post pivotally connected to the other end of the frame.

3. A truck comprising a wheeled frame having vertically arched side members, depending support arms at one end of the frame, a post connected to the other end of the frame and lugs upon the upper faces of the arched side members.

4. A truck comprising a wheeled frame having arched side members, depending support arms at one end of the frame to receive the front axle of an automobile and a pivoted post at the other end of the frame for engagement with the rear portion of the automobile, the arched side members being adapted to receive a removable board to engage the crank case of the automobile.

5. A truck comprising a wheeled frame having vertically arched side members, depending support arms at one end of the frame, and an adjustable post pivotally connected to the other end of the frame.

6. A truck comprising a V-shaped frame including a pair of vertically arched side members, depending support arms upon one end of the frame for receiving the front axle of an automobile and a pivoted, forked post at the other end of the frame for engagement with the rear portion of the automobile, the arched side members being adapted to receive a removable board to engage the crank case of the automobile in order to tilt the automobile into a horizontal position.

7. A truck comprising a wheeled V-shaped frame having vertically arched side members, depending support arms at one end of the frame, a forked, adjustable post pivotally connected to the other end of the frame, and lugs upon the upper faces of the arched side members.

8. A truck comprising a wheeled frame having arched side members, lugs upon said side members, depending support arms at one end of the frame to receive the front axle of an automobile and a pivoted, forked post at the other end of the frame for engagement with the rear portion of the automobile, the lugs upon the arched side members being adapted to receive a removable board to engage the crank case of the automobile.

In testimony that I claim the above, I have hereunto subscribed my name.

ALBERT A. CLARK.